US012624424B2

(12) United States Patent
Zheng et al.

(10) Patent No.: US 12,624,424 B2
(45) Date of Patent: May 12, 2026

(54) SOLID METAL MATERIAL QUICKLY SOLUBLE IN WATER AND PREPARATION METHOD THEREFOR

(71) Applicant: SHENZHEN MGCLEAN TECHNOLOGY CO., LTD, Guangdong (CN)

(72) Inventors: Songyuan Zheng, Shenzhen (CN); Sheng Yuan, Shenzhen (CN)

( * ) Notice: Subject to any disclaimer, the term of this patent is extended or adjusted under 35 U.S.C. 154(b) by 432 days.

(21) Appl. No.: 17/918,408

(22) PCT Filed: Sep. 17, 2020

(86) PCT No.: PCT/CN2020/115982

§ 371 (c)(1),
(2) Date: Feb. 5, 2023

(87) PCT Pub. No.: WO2022/056790

PCT Pub. Date: Mar. 24, 2022

(65) Prior Publication Data

US 2023/0193434 A1 Jun. 22, 2023

(51) Int. Cl.

| | |
|---|---|
| ***C22C 23/06*** | (2006.01) |
| ***C11D 7/04*** | (2006.01) |
| ***C11D 17/06*** | (2006.01) |
| ***C22C 1/02*** | (2006.01) |
| ***C22C 23/02*** | (2006.01) |

(52) U.S. Cl.

CPC ................ *C22C 23/02* (2013.01); *C11D 7/04* (2013.01); *C11D 17/06* (2013.01); *C22C 1/02* (2013.01); *C11D 2111/12* (2024.01)

(58) Field of Classification Search

CPC ............ C22C 23/06; C22C 23/00; C22F 1/06
See application file for complete search history.

(56) References Cited

FOREIGN PATENT DOCUMENTS

| | | |
|---|---|---|
| CN | 105647688 | 6/2016 |
| CN | 109628238 | 4/2019 |
| CN | 211227745 | 8/2020 |
| KR | 10-2018-0013293 | 2/2018 |

OTHER PUBLICATIONS

International Search Report for International Application No. PCT/CN2020/115982, mailed Apr. 29, 2021, pp. 1-4.

*Primary Examiner* — Jessee R Roe

(74) *Attorney, Agent, or Firm* — The Law Office of Kevin McDermott, P.L.L.C.

(57) ABSTRACT

The present application provides a solid metal material quickly soluble in water, comprising components of magnesium, gadolinium, yttrium, praseodymium, neodymium, platinum, hafnium, nickel, potassium, and manganese in a specific proportion. Furthermore, the solid metal material quickly soluble in water further comprises aluminum, copper, calcium, iron, zinc, and sodium. The present application also provides a preparation method for the solid metal material quickly soluble in water. The solid metal material quickly soluble in water provided by the present application is a quickly soluble magnesium alloy material capable of adapting to the waiting time requirement of the public for washing, can be hydrolyzed, and can react with water in a washing machine, and is environmentally friendly. Washing substances remaining on the clothes have no irritation to human skin contact, and the washing and discharging sewage discharged after washing has no harm to the environment.

6 Claims, 1 Drawing Sheet

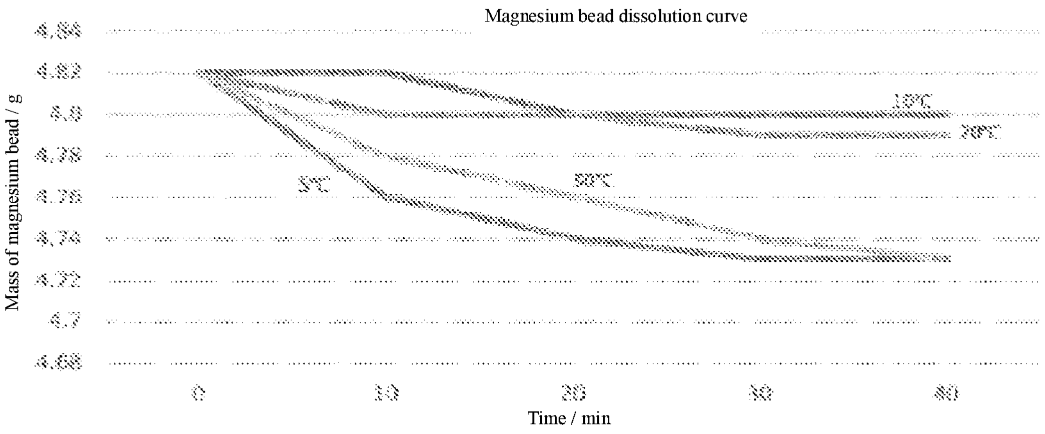
Magnesium bead dissolution curve
Mass of magnesium bead / g
4.84
4.82
4.8
4.78
4.76
4.74
4.72
4.7
4.68
0
10
20
30
40
Time / min
10°C
20°C
30°C
5°C

SOLID METAL MATERIAL QUICKLY SOLUBLE IN WATER AND PREPARATION METHOD THEREFOR

TECHNICAL FIELD

The present application relates to the technical field of quickly water-soluble solid metal materials, and in particular to a quickly water-soluble solid metal material and a preparation method thereof.

BACKGROUND

The cleaning materials, currently available on the market, are chemically-synthesized products basically, such as laundry powder, laundry detergent, and laundry beads, which are all based on petroleum-based polymer compounds. The current detergent surface active materials are made of polyethylene glycol—Polyoxyethylene. And there is another type of the detergent surface active material that is made of polyols, such as glycerol, pentaerythritol, and sorbitol. The residue of washing products, remaining on clothes after each washing, has a great impact on human health, such as irritation to the skin and damage to internal organs. Moreover, after discharging of the washing wastewater, the chemicals in the detergent cannot be effectively degraded by bacteria in nature, causing secondary pollution to the environment.

Magnesium metal is a silver-white light metal, which is stored in large quantities in alkaline earth and seawater (the content is about 0.4%), is light in weight and chemically active, and can react with water to generate hydrogen. Magnesium element is widely distributed in nature and is also one of the essential elements of the human body (the total magnesium content of a normal adult body is about 25 g, 60% to 65% of which exist in bones and teeth, and 27% are distributed in soft tissues). Magnesium is a necessary substance in the human body in terms of the metabolism of calcium, vitamin C, phosphorus, sodium, potassium, etc., and plays an important part in the normal functioning of neuromuscular functions and blood glucose conversion. Therefore, magnesium is one of the essential elements of the human body. If it is introduced into washing products, it will be bound to reduce the harm of washing products to the human body.

SUMMARY

The technical problem solved by the present application is to provide a quickly water-soluble solid metal material and a preparation method thereof. The solid metal material provided by the present application has a fast dissolving speed in water and a good washing effect, and is harmless to the human body as well as the environment.

In view of this, a portable, environmentally-friendly solid washing material can be produced by using magnesium, which is convenient for everyone to carry during the trip. Specifically, the present application provides a quickly water-soluble solid metal material for washing, comprising:

| | |
|---|---|
| Magnesium | 90-95 PBW; |
| Gadolinium | 0.1-1.0 PBW; |
| Yttrium | 0.3-0.7 PBW; |
| Praseodymium | 10~80 ppm; |
| Neodymium | 0.01-0.03 PBW; |
| Platinum | 0.1-0.2 PBW; |
| Hafnium | 0.05-0.1 PBW; |
| Nickel | 0.1-1.0 PBW; |
| Potassium | 0.4-0.6 PBW; |
| Manganese | 0.1-0.2 PBW. |

Optionally, the washing product further comprises: 3-8 PBW of aluminum, 0.1-5 PBW of copper, 0.3-0.5 PBW of calcium, 0.1-1.0 PBW of iron, 0.1-0.2 PBW of zinc, and 0.5-0.8 PBW of sodium.

Optionally, the content of the magnesium is 92-94 PBW.

Optionally, the content of the aluminum is 4-6.5 PBW.

Optionally, the content of the gadolinium is 0.5-0.8 PBW.

Optionally, the content of the nickel is 0.3-0.7 PBW.

The present application also provides a method for preparing the quickly water-soluble solid metal material, comprising the following steps:

According to the proportion of ingredients, the raw materials are mixed and melted, then cast, then drawn and formed, and finally heated and punched out to form a spherical shape to obtain a quickly water-soluble solid metal material.

The present application provides a quickly water-soluble solid metal material, which comprises magnesium, gadolinium, yttrium, praseodymium, neodymium, platinum, hafnium, nickel, potassium and manganese in specific proportions. After the quickly water-soluble solid metal material provided by the present application dissolves in water, the pH can be around 10, which can dissolve the grease adhered to the clothes by the human body, kill the mold. At the same time, the hydrogen generated through the reaction of some alloy elements in the washing product with water enters the gap of the clothes, which can accelerate the removal of stains. Therefore, the quickly water-soluble solid metal material has a good washing effect. Further speaking, the above-mentioned elements added to the quickly water-soluble solid metal material provided by the present application can be dissolved in water, which can satisfy the consumers' waiting time for washing, the above-mentioned quickly water-soluble solid metal material uses magnesium element as a matrix element, which is harmless to the human body and the environment.

DESCRIPTION OF THE DRAWING

FIG. 1 is a time curve of the dissolution rate of magnesium alloy washing balls prepared in Embodiment 1 of the present application under different water temperatures.

DETAILED DESCRIPTION

In order to further understand the present application, the preferred embodiments of the present application are described below with reference to the embodiments, but it should be understood that these descriptions are only for further illustrating the features and advantages of the present application, rather than limiting the claims of the present application.

In view of the problem that the current washing products, such as laundry detergent or washing powder, are harmful to the human body and the environment, the present application provides a quickly water-soluble solid metal material, which is composed of a variety of alloy elements and does not contain organic chemical components, hence, it reduces the impact of organic compounds on the human body. In addition, the quickly water-soluble solid metal material has better washing and dissolving effects when utilized for laundry washing. Specifically, the quickly water-soluble solid metal material for washing described in the present application comprises:

| | |
|---|---|
| Magnesium | 90-95 PBW; |
| Gadolinium | 0.1-1.0 PBW; |
| Yttrium | 0.3-0.7 PBW; |
| Praseodymium | 10~80 ppm; |
| Neodymium | 0.01-0.03 PBW; |
| Platinum | 0.1-0.2 PBW; |
| Hafnium | 0.05-0.1 PBW; |
| Nickel | 0.1-1.0 PBW; |
| Potassium | 0.4-0.6 PBW; |
| Manganese | 0.1-0.2 PBW. |

In order to further improve the effect of the quickly water-soluble solid metal material, the quickly water-soluble solid metal material further comprises: 3-8 PBW of aluminum, 0.1-5 PBW of copper, 0.3-0.5 PBW of calcium, 0.1-1.0 PBW of iron, 0.1-0.2 PBW of zinc, and 0.5-0.8 PBW of sodium.

In the quickly water-soluble solid metal material for washing, magnesium is used as the main basic element, which can form magnesium hydroxide after dissolving in water, so that the pH of the washing water is alkaline, hence, the grease on the clothes can be dissolved and the mold can be killed. At the same time, the generated hydrogen can enter the gap of clothes, which can further accelerate the removal of stains, thereby improving the washing effect of washing products. The content of the magnesium is 90-95 PBW, and in a specific embodiment, the content of the magnesium is 92-94 PBW.

The content of the aluminum is 3-8 PBW, and in a specific embodiment, the content of the aluminum is 4-6.5 PBW.

The content of the calcium is 0.3-0.5 PBW. The content of the copper is 0.1-5 PBW, and in a specific embodiment, the content of the copper is 2-4 PBW.

The content of the iron is 0.1-1.0 PBW, and in a specific embodiment, the content of the iron is 0.3-0.7 PBW.

The gadolinium, the yttrium, and the praseodymium can affect the rate of dissolution in water. The content of the gadolinium is 0.1-1.0 PBW, and in a specific embodiment, the content of the gadolinium is 0.5-0.8 PBW. The content of the yttrium is 0.3-0.7 PBW, and the content of the praseodymium is 10-80 ppm.

The hafnium is used as a dissolution sustained-release material for the magnesium material. The content of the hafnium is 0.05-0.1 PBW. The potassium, as a material for improving the density of magnesium materials, can improve the density of alloy materials when coming out of a smelting furnace. The content of the potassium is 0.4-0.6 PBW. The manganese is used to adjust the grain size of the material, and the content of the manganese is 0.1-0.2 PBW.

The content of the sodium is 0.5-0.8 PBW. The neodymium is used as a sustained-release material for dissolving the magnesium material, and the content of the neodymium is 0.01-0.03 PBW. The platinum is used as a reaction catalyst, and the content of the platinum is 0.1-0.2 PBW.

The nickel can adjust the amount of hydrogen in course of decomposition during the metal dissolution process, and its content is 0.1-1.0 PBW. In a specific embodiment, the content of the nickel is 0.3-0.7 PBW.

The present application also provides a method for preparing the quickly water-soluble solid metal material, comprising the following steps:

According to the proportion of ingredients, the raw materials are mixed and melted, then cast, then drawn and formed, and finally, the required diameter of the magnesium ball is extruded by heating and punching to obtain a quickly water-soluble solid metal material.

In the process of preparing the above-mentioned quickly water-soluble solid metal material, the present application firstly mixes the raw materials as per the above-mentioned proportional relationship and then melts them in a reverberatory furnace, and then enters the casting process to obtain the bulk metal material. The melting and the casting belong to the technical means widely known to those skilled in the art, and there is no special limitation to the present application. In the present application, the bulk metal material is then drawn and formed, and finally heated and punched to obtain a quickly water-soluble solid metal material. For the convenience of utilization, the quickly water-soluble solid metal material mentioned in the present application is preferably prepared into a spherical shape, i.e. magnesium alloy washing ball.

The quickly water-soluble solid metal material provided by the present application is a magnesium alloy material that can meet the waiting time demands of the public for washing, can be hydrolyzed and can be quickly dissolved in a washing machine through reacting with water. It is environmentally-friendly (no heavy metal residues and chemical residues). The washing substances remaining on the clothes have no irritation to human skin contact. The waste water discharged after washing is not harmful to the environment.

In order to further understand the present application, the quickly water-soluble solid metal material for washing provided by the present application would be described in detail below with reference to the embodiments, and the protection scope of the present application is not limited by the following embodiments.

Embodiment 1

A 6 mm magnesium alloy washing ball, comprising 92.2 PBW of magnesium, 0.93 PBW of gadolinium, 0.65 PBW of yttrium, 13.7 ppm of praseodymium, 0.02 PBW of neodymium, 0.105 PBW of platinum, 0.0851 PBW of Hafnium, 0.38 PBW of nickel, 0.45 PBW of potassium, 0.15 PBW of manganese, 3.51 PBW of aluminum, 0.48 PBW of calcium, 0.3 PBW of copper, and 0.72 PBW of iron.

Detect the decomposition of the above-mentioned magnesium alloy washing balls in 1 L of water (the test environment temperature is 26° C. and the humidity is 45% RH), that is, the time curve for testing the dissolution rate of the magnesium alloy washing balls under different water temperatures, as shown in FIG. 1. And detect the pH value of the washing solution after the decomposition of the magnesium alloy washing balls at different water temperatures (10° C.-40° C.). The pH increases slowly with soaking time, and could reach more than 10 after soaking for 5 min, and remain at about 11 after soaking for 20 min.

The washing effect of the above-mentioned magnesium alloy washing balls was tested by the Shenzhen Academy of Metrology & Quality Inspection of China as per the Chinese testing standard of GB/T13174-2008, and was compared with the standard washing powder, and the results are shown in Table 1;

TABLE 1

Comparison of washing effect between the magnesium alloy washing balls of the present embodiment and the standard washing powder

| Group | Detergency value of standard washing powder (concentration 0.2%, 5 L water) | Detergency value of magnesium alloy washing ball (600 g, 5 L water) |
|---|---|---|
| Carbon black oil stained cloth (JB-01) | 15.3% | 16.3% |
| Protein stained cloth (JB-02) | 6.3% | 6.8% |
| Sebum stained cloth (JB-03) | 19.5% | 20.0% |

The antibacterial effect of the above-mentioned magnesium alloy washing balls was also tested by the Shenzhen Academy of Metrology & Quality Inspection of China as per the Chinese testing standard, and the results are shown in Table 2.

TABLE 2

Antibacterial effect table of magnesium alloy washing balls of the present embodiment

| Test item | Standard requirement Refer to QB/T2850-2007 antibacterial detergent Class B | Measured results | Testing basis |
|---|---|---|---|
| Bacteriostatic rate (*Staphylococcus aureus* ATCC6538), % | ≥50 | 53 | QB/T2738-2012 |
| Bacteriostatic rate (*Escherichia coli* 8099), % | ≥50 | 53 | QB/T2738-2012 |

Embodiment 2

A 6 mm magnesium alloy ball, comprising 92.5 PBW of magnesium, 0.33 PBW of gadolinium, 0.33 PBW of yttrium, 20 ppm of praseodymium, 0.02 PBW of neodymium, 0.16 PBW of platinum, 0.085 PBW of hafnium, 0.38 PBW of nickel, 0.45 PBW of potassium, 0.2 PBW of manganese, 3.51 PBW of aluminum, 0.3 PBW of copper, 0.33 PBW of calcium, 0.7 PBW of iron, 0.1 PBW of zinc, and 0.6 PBW of sodium.

The descriptions of the above-mentioned embodiments are only used to facilitate understanding the method and the core thought of the present application. It should be pointed out that for those of ordinary skill in the art, without breaking away from the principles of the present application, certain improvements and modifications may be made to the present application, which also fall within the scope of protection of the claims of the present application.

The foregoing description of the disclosed embodiments enables a person skilled in the art to implement or use the present application. Various modifications to the embodiments are obvious to the person skilled in the art, and general principles defined herein may be implemented in other embodiments without departing from the spirit or scope of the present application. Therefore, the present application will not be limited to the embodiments described herein, but extends to the widest scope that complies with the principles and novelties disclosed herein.

The invention claimed is:

1. A water-soluble solid metal material, comprising:

| | | |
|---|---|---|
| Magnesium | 90-95 | PBW; |
| Gadolinium | 0.1-1.0 | PBW; |
| Yttrium | 0.3-0.7 | PBW; |
| Praseodymium | 10~80 | ppm; |
| Neodymium | 0.01-0.03 | PBW; |
| Platinum | 0.1-0.2 | PBW; |
| Hafnium | 0.05-0.1 | PBW; |
| Nickel | 0.1-1.0 | PBW; |
| Potassium | 0.4-0.6 | PBW; and |
| Manganese | 0.1-0.2 | PBW. |

2. The water-soluble solid metal material according to claim 1, wherein the water-soluble solid material further comprises: 3-8 PBW of aluminum, 0.1-5 PBW of copper, 0.3-0.5 PBW of calcium, 0.1-1.0 PBW of iron, 0.1-0.2 PBW of zinc, and 0.5-0.8 PBW of sodium.

3. The water-soluble solid metal material according to claim 1, wherein the content of the magnesium is 92-94 PBW.

4. The quickly water-soluble solid metal material according to claim 2, wherein the content of the aluminum is 4-6.5 PBW.

5. The water-soluble solid metal material according to claim 1, wherein the content of the gadolinium is 0.5-0.8 PBW.

6. The water-soluble solid metal material according to claim 1, wherein the content of the nickel is 0.3-0.7 PBW.

* * * * *